(12) United States Patent
Jungleib et al.

(10) Patent No.: US 8,362,766 B2
(45) Date of Patent: Jan. 29, 2013

(54) CIRCUIT FOR ANALYZING AND AFFECTING SUBTLE ENERGY RESONANCE

(75) Inventors: Stanley Jungleib, Portola Valley, CA (US); Joel Bruce Wallach, Los Angeles, CA (US)

(73) Assignee: Stanley Jungleib Laboratories LLC, Portola Valley, CA (US)

( * ) Notice: Subject to any disclaimer, the term of this patent is extended or adjusted under 35 U.S.C. 154(b) by 554 days.

(21) Appl. No.: 12/628,628

(22) Filed: Dec. 1, 2009

(65) Prior Publication Data

US 2011/0131477 A1 Jun. 2, 2011

(51) Int. Cl.
*G01V 3/00* (2006.01)
*G01R 31/02* (2006.01)
*G11C 29/00* (2006.01)

(52) U.S. Cl. .......... 324/300; 324/415; 714/718
(58) Field of Classification Search .......... 324/415, 324/300
See application file for complete search history.

(56) References Cited

U.S. PATENT DOCUMENTS

| | | | | |
|---|---|---|---|---|
| 3,636,752 A * | 1/1972 | Ishii | 73/514.16 |
| 4,733,165 A * | 3/1988 | Richardson et al. | 324/636 |
| 5,336,988 A * | 8/1994 | Chmielewski et al. | 324/76.19 |
| 6,147,502 A * | 11/2000 | Fryer et al. | 324/637 |
| 6,172,510 B1 * | 1/2001 | Liu | 324/632 |
| 6,208,153 B1 * | 3/2001 | Flugan | 324/727 |
| 7,049,814 B2 * | 5/2006 | Mann | 324/300 |
| 7,239,150 B2 * | 7/2007 | Troxler et al. | 324/643 |
| 7,276,892 B2 * | 10/2007 | Trutna et al. | 324/76.19 |
| 7,856,665 B2 * | 12/2010 | Rutgers et al. | 850/44 |
| 8,248,075 B2 * | 8/2012 | Brannan et al. | 324/415 |
| 2006/0022960 A1 * | 2/2006 | Fukushima | 345/173 |

OTHER PUBLICATIONS

"Spooky Eyes: Using Human Volunteers to Witness Quantum Entanglement," Scientific American, Charles Q. Choi, Jun. 3, 2010, http://www.scientificamerican.com/article.cfm?id=human-eyes-entanglement&print=true.
"Entangled minds: extrasensory experiences in a quantum reality," Dean Radin,, p. 294, Pocket Books, 2006.
"A Subtle Energy Technology for Noise Reduction in Physical and Psychological Systems," T.M. Srinivasan, Ph.D., www.clarus.com, Jan. 1999.
"New experimental data revealing an unexpected dimension to materials science and engineering," William A.Tiller, and Walter E. Dibble, Jr., Materials Research Innovations,vol. 5, pp. 21-34, Springer-Verlag 2001.
"Towards a Quantitative Science and Technology that Includes Human Consciousness," William A.Tiller, Ph.D, California Institute for Human Science Journal, vol. 2, No. 1, Jul. 2007, www.cihs.edu.

(Continued)

*Primary Examiner* — James C Kerveros
(74) *Attorney, Agent, or Firm* — Carr & Ferrell LLP

(57) ABSTRACT

Systems and methods for analyzing and affecting manifestations of subtle energy resonance are provided. A memory array associated with a transducer is read and stored in a memory of an analysis device. The memory array is then exposed to an energy environment which causes changes to the memory array. A second reading of the memory array indicates the changes to the memory array as compared to the first reading. The detected changes are analyzed and used to generate an energy signature and a report concerning any combination of the changes, the rate of changes, and the generated energy signature. The energy data concerns subtle energy in a designated energy environment which may include one or more animate or inanimate crystalline resonators. Tuning of a generator allows for manipulation of cell resonance, which may be used for research or in order to produce a desired resonance.

9 Claims, 7 Drawing Sheets

OTHER PUBLICATIONS

"Electromagnetic and Other Subtle Energies in Psi Research," Beverly Rubik, Ph.D., Subtle Energies and Uncharted Realms of the Mind, an Esalen Invitation Conference, http://www.esalenctr.org/display.confpage.cfm?confid=8&pageid=69&pgtype=1, Jul. 2-7, 2000.

"Bob's Rock Shop: Introduction to Crystallography and Mineral Crystal Systems," Part 2: Crystal Forms and Symmetry Classes, Mike Howard and Darcy Howard, http://www.rockhounds.com/rockshop/xtal/part2.html, Jun. 16, 2007.

"Correlation between nanosecond X-ray flashes and stick-slip friction in peeling tape," Carlos G. Camara, Juan V. Escobar, Jonathan R Hird, and Seth J. Putterman, Nature, vol. 455, Letters, p. 1089, Oct. 23, 2008.

"Latch-up (or What Makes Good CMOS go Bad," Austin Lesea, Xilinx User Community Forums PLD Blog, http://forums.xilinx.com/xlnx/blog/article?message.uid=10516, May 9-Jul. 8, 2008.

"Mind of a Rock," Jim Holt, New York Times, http://www.nytimes.com/2007/11/18/magazine/18winn-lede-t.html?_r-2&ref=magazine&oref=slogin&oref=slogin, Nov. 18, 2007.

English translation and summary of "Russian DNA Discoveries" from "Vernetzte Intelligenz," Fosar von Grazyna and Franz Bludorf, ISBN 3930243237, summarized by Baerbel, 2001.

"CMOS as Sea Level, in Avionics, Low Earth Orbits and Outer Space: Interference on CMOS Circuitry by High Energy Cosmic Rays," presentation by Erik Hedlund and Magnus Persson, Lund University, Feb. 14, 2008.

"Introducing the Space Conditioner 30," Stanley Junglieb, Mark Hempel, and Joel Wallach, Vispirito internal document, pp. 1-15, Dec. 13, 2006.

"Biological and Clinical Studies: Sympathetic Resonance Technology (SRT) and the Q-Link Products," Clarus Products International, L.L.C. 1, 2002.

"Invention by Intention: The Space Conditioner 30," Stanley Junglieb, Vispirito internal document, Parts 1-3, Dec. 13, 2006.

Certificates: DIN EN 61010-1:2002, DIN EN 61326-1:2006, Certificate of Conformity # CE801.B06008, Patent for invention #41626, Patent for invention #2217047, patent for invention #2141250, Certificate KTI Latina, http://www.korotkov.org, Feb. 7, 2008.

"Can the QLink Ally, A Form of Sympathetic Resonance Technology (SRT), Attenuate Acute Mobile Phone Related Changes to Neural Function? A Pilot Study," Rodney J. Croft, Jody S. Chandler, Adrian P. Burgess, Robert J. Barry, John D. Williams, and Adam R. Clarke, Brain & Behaviour Research Institute, University of Wollongong, Wollongong, Australia, 2002.

"Conscious acts of creation: the emergence of a new physics," William A. Tiller, Ph.D., Walter E. Dibble, Jr., and Michael J. Kohane, Appendix 1.A. Some Device Essentials, pp. 17-19, Pavior Publishing, ISBN 1-929331-04-5, 2001.

"Mobile phone radiation wrecks your sleep," Geoffrey Lean, Environment Editor, www.independent.co.uk/loSblogs, Jan. 20, 2008, quoted in email message from Stanley Junglieb to Sally Taft, Jan. 23, 2008.

White Paper 3, "Application Development," Andrea J. Tiller and William A. Tiller, 10-D Innovations, Inc, 2005.

"The Conscious Creation of a New Paradigm," interview with Dr. William A. Tiller, Celeste Adams (author), http://netmar.com/~maat/archive/mar2/tiller1.htm, Oct. 26, 2006.

"The standard model of particle physics," Insight Glossary, Nature, vol. 448, Jul. 19, 2007, p. 270.

"Effects of Intentionally Enhanced Chocolate on Mood," Dean Radin, PhD., Gail Hayssen, and James Walsh, Explore, Elsevier, Inc., vol. 3, No. 5, Sep./Oct. 2007, pp. 485-492.

"The Effect of Intention on Decreasing Anxiety and Depression Utilizing Intention Imprinted Devices," Cynthia R. Reed, Abstract of dissertation for Doctor of Theology, Holos University Graduate Seminary, 2005.

"Replication Attempt: No Development of pH or Temperature Oscillations in Water Using Intention Imprinted Electronic Devices," Lynne I. Mason and Robert P. Patterson, Journal of Scientific Exploration, vol. 17, No. 3, pp. 521-526, 2003.

Product catalog, http:://www.Tools for Wellness.com, 2005.

"Cross Currents: The promise of electromedicine, the perils of electropollution," Robert O. Becker, Chapter 8, 5 pages.

Email, Stanley Junglieb to Gary DiBenedetto and Ian Grant, Feb. 17, 2006.

EMF-Health.com, QLink, http://www.emf-health.com, Apr. 12, 2010, 21 pages.

SkyMall Gift Shop, "Electronic Feng Shui Compass," http://www.skymall.com/shopping/detail.htm?pid=102727481, Apr. 12, 2010, 3 pages.

B. Mereu et al., "Chaos supported stochastic resonance in a metal-ferroelectric-semiconductor heterostructure," Physical Review E 71 047201, The American Physical Society, 2005, pp. 1-4.

\* cited by examiner

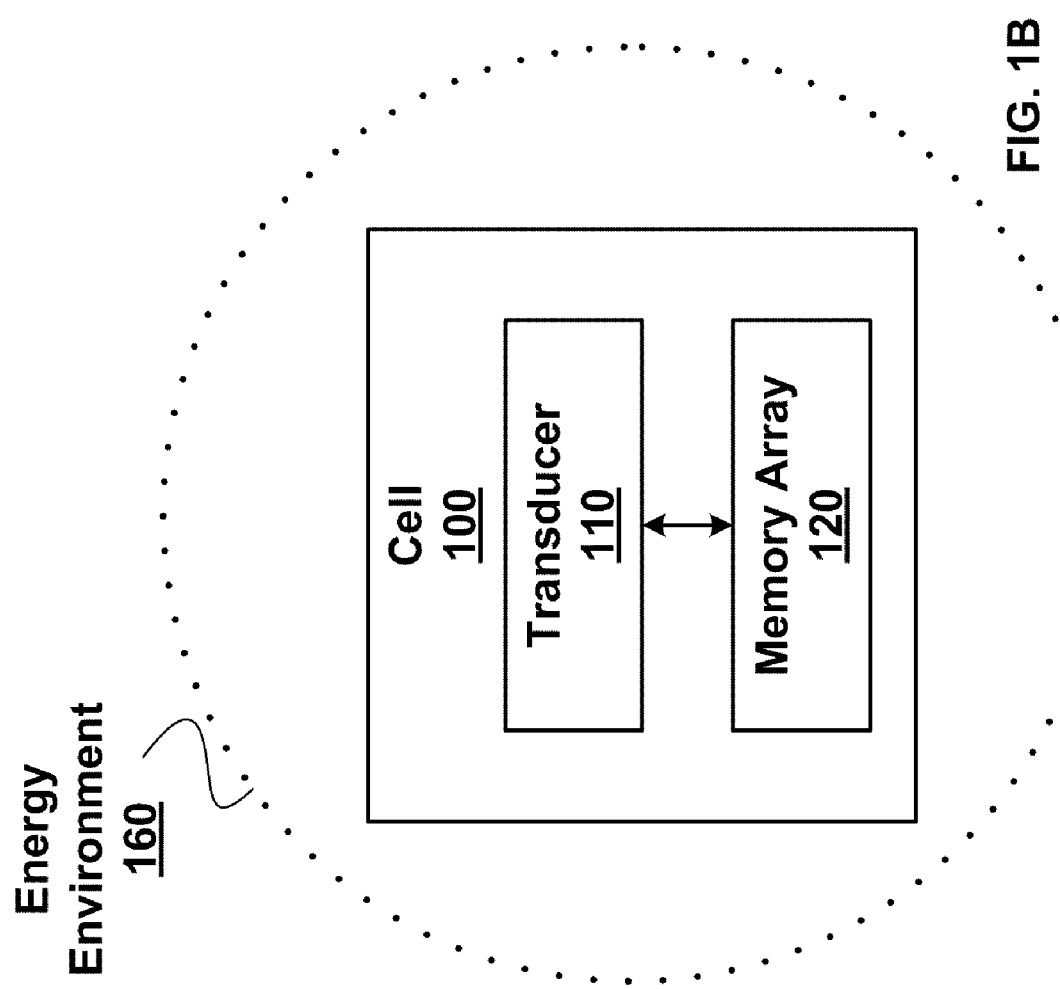

CIRCUIT FOR ANALYZING AND AFFECTING SUBTLE ENERGY RESONANCE

BACKGROUND OF THE INVENTION

1. Field of the Invention

The present invention generally relates to systems and methods of data analysis and generative response. More specifically, the present invention relates to analysis and control of manifestations of subtle energy resonance. An event that can be reliably detected and recorded, such as a change of value of a digital circuit element, may fall within this analysis. Reciprocally, intentional replication of an event detected by analysis should produce a determinable effect in subtle energy resonance.

Evidence for entanglement between human consciousness, space, and semiconductors has steadily accumulated for two decades. The present invention newly quantifies this phenomenon as a subtle energy resonance between objects ("subtle energy" for short) which possibly entangle by virtue of their fundamental and common crystalline organization. Significantly for the present invention, examples of these objects include, but are not limited to, a human body and an integrated circuit.

2. Description of Related Art

Resonance between objects is widely understood and recognized throughout standard Newtonian mechanics, and generally employed throughout standard Maxwellian electronics. Physics now refers to this classic energetic model as the U(1) gauge state. The present invention and its guiding theory are conceived entirely within this standard reference frame (RF).

Simultaneously, the invention may analyze entanglement encompassing deeper phenomena commonly explained by quantum physics. Note that quantum physics has several standard reference frames (RFs). Indeed, the invention has been theorized to also operate at the deeper SU(2) gauge state level. This is tantamount to saying that the technology may access (entangle with) energy embedded within the vacuum.

The invention indicates and quantifies behavior previously unidentified within the U(1) RF. Understanding that these two RFs are parallel models, an embodiment of the present invention can be understood as a U(1) analyzer or generator of SU(2) energy manifestations. The subtle energy manifestations may arise from the application of ambient electromagnetic waves. Alternatively, or simultaneously, these subtle energy manifestations may arise from alterations in the physics of space itself. For simplicity, this specification assumes the common U(1) model. To teach or practice the invention so far it is unnecessary to use any RFs of quantum physics, as long as it is understood that the invention's novel operations, observations, and claims may ultimately only be thoroughly explicable from within that field of study.

In recognition of the electromagnetic (EM) properties of crystals and their multifarious omnipresence throughout the inanimate and animate world, resonance or entanglement between the earth or its harvested crystals, electronics based upon them, and humans is quite plausible.

Natural crystals organize innumerable minerals according to a limited and specific set of lattice and point systems. With respect to the electromagnetic spectrum, the crystal's specific mineral content and lattice organization strictly determines how it grows, and eventually receives, stores, transforms, and radiates specific frequencies. This is often illustrated by the common prism. More relevant to this field is the well-known property of fluorescence which results from a crystal's converting of ultraviolet (invisible) light into the visible range. Thus, natural or synthetic crystals provide a variety of unique and critical EM functions such as predictable and precise frequency filtering and conversion.

From cell to bone, the animal body is constructed almost entirely of complex crystalline arrays built from carbon, calcium, sodium, magnesium, and so on. The state and growth of this biodynamic living array may be exquisitely guided by an overlay of global and local electrical systems.

Finally, integrated circuits—in particular, memories which include millions of highly-ordered crystalline mineral lattice systems—can be removed from their original design context and instead unconventionally wired to emulate the functions of natural crystals with respect to receiving, storing, transforming, and radiating EM waves of specific frequencies.

The effect of ambient EM upon any crystalline array depends upon the resonant susceptibility of the specific array. So, the same ambient spectrum may only mildly perturb some materials while simultaneously destroying others. In contrast to the subtle and complex commonality of natural EM interacting with evolving crystalline systems it must unfortunately be noted—but not without relevance to the motivation of the invention—that a century of learned exploitation of the EM spectrum primarily for high-powered radio communication of ever higher frequencies has created an omnipresent smog of unnatural ambient EM.

The power of ambient radio EM is well illustrated by the 1920s-era crystal radio. A crystal radio may operate as a radio receiver without any battery or power source other than radio waves themselves. Crystal radios usually include a wire antenna, a ground wire, a tuner circuit, a crystal diode detector and an earphone. Radio waves travel from the antenna wire through the coil and capacitor (LC) tuner to the ground wire. The tuner circuit is adjusted to resonate with the radio-frequency energy from a particular station of interest. The crystal (originally an actual germanium or silicon crystal) in the crystal radio converts the resonated ambient EM waves to recover the electrical current, while the earphones convert that current into sound.

Returning to the example above of the semiconductor array operated, perhaps unconventionally, so as to exploit its inherent crystalline properties, the present system is accordingly theorized to operate somewhat like a highly-multiple-channel crystal radio. Each receiving or generating channel of this initial embodiment may arise from the geometrical precision of digital arrays especially such as memories. In the classic crystal radio, the LC tuner circuit acts as a low-quality resonator yielding low precision. However, in non-standardly energized digital arrays, crystalline elements may transceive both as highly selective frequency-specific resonators or oscillators, as well as demodulators or modulators. This aggregated, crystalline subtle energy transceiver resonates with and apparently adapts to subtle energy changes as reflected in dynamic bit change activity which is detectable by the systems and methods taught herein. Reciprocally, altering the bit states of a device in a first energy environment induces subtle energy alterations in a second energy environment.

Thus, arising from both the pervasiveness of EM and the crystalline substrate of most of the material world, a given subtle energy environment may include one or more non-obvious sources of energy, and due to the resonance in such an energy environment this energy may be responded to and/or re-radiated by resonant (susceptible) objects. Such energy environments may include various natural or synthetic, chemical or biological crystalline elements in any combination.

Subtle energy may have been studied prior under a variety of names and concepts, including psychoenergetics, 'psi,' augmented-electromagnetics or paramagnetisms—some of which attempt to evade Maxwell's dominating equations from 1861—the Od Force, orgone energy, tachyons, reciprocal electromagnetism-deltrons-monopoles, and so on, most of which are subject to ongoing theoretical debate and refinements. As mentioned above, an eventual interpretation of subtle energy which encompasses any of the multitudes of particles and forces within the current standard model of quantum physics cannot be precluded. Nevertheless, as mentioned above, the invention's guiding theory requires no departures from the standard EM RF. In that context, the invention presently models its subject energy as subtle, but wide-ranging, broadband EM energy with specific timings, in specific distributions and phase, with the resultant ability to non-obviously resonate in a variety of common materials, including, but not limited to, crystals, semiconductors, and (living) cells. In the field of biology, this ability of wide-spectrum subtle EM to be detected and processed by crystalline-based biological arrays in concert with apparently dominant noise has already been identified as stochastic resonance (SR). In that sense, one can think of embodiments of the invention as extending SR over primarily electronic objects hitherto regarded as entirely inanimate.

In contrast to conventional radio energy practice which concentrates power at a particular frequency in the EM spectrum, subtle energy may instead be characterized by a broad but specific resonance and distribution of harmonics, subharmonics, and inharmonics of specific phase. This specific distribution is theorized to constitute a broadband timbre, modeled upon the way, for example, that music synthesizers transfer acoustic instrument information through time-variant control over levels of specific identifying overtones. In contrast to the physical-acoustic range, detecting manifestations of the extremely wideband subtle EM energy as suggested here may have thus far been difficult because of the bandwidth and resolution of typical instrumentation. This problem may be compounded by noise from other sources of ambient EM. Furthermore, the problem may be exacerbated because there is a lack of attention to tools correlating (extremely wide) broadband subtle energies. Difficulties in studying subtle energies may further include lack of reliable instrumentation with respect to real-time detection and analysis. There is therefore a need for improved systems and methods for analyzing manifestations of subtle energy resonance.

Once subtle energy manifestations can be quantified and analyzed, the obvious next step is to affect the subtle energy resonance in a quantifiable manner. Further embodiments provide for systems and methods for affecting subtle energy via a reciprocal, generative process.

SUMMARY OF THE INVENTION

Some embodiments of the present invention provide for systems and methods for analysis of manifestations of subtle energy. The analysis concerns the manifestations of subtle energy resonance in a particular environment including two or more energy resonators. Subtle energy may be received and identified based on its resonance in crystalline structures. Such subtle energy sources may include various resonating crystalline structures, including individuals, marble and granite buildings, semiconductors, metals, and so on. The component used for analysis will herein be referred to as an analyzer. Other embodiments of the present invention provide for systems and methods for quantifiably affecting manifestations of subtle energy. This is called generating a response.

The component used for generating a response will herein be referred to as a generator. Other embodiments of the present invention provide for systems and methods that combine one or more analyzers and one or more generators into a system. The symmetry of the system is intended to capture and emulate, as accurately as possible, subtle energy states of interest for research or processing.

An exemplary system may include an analyzer, a generator, and control programs. One system component used for both the analyzer and the generator is a cell. A cell includes a memory array, or "memory" for short. A cell may optionally include other elements, such as a specific material composition and an antenna. In some embodiments the cell includes a package of transducer material, or a transducer for short. In a cell the memory may not be wired conventionally, depending on the mode of operation. When a cell is used during analysis, the contents of the memory of this cell is read and stored in some memory of a (possibly external) analysis device, which is communicatively coupled to the cell. Reading and storing uses conventional techniques and wiring. The modes of operation for sensing and generating may not necessarily use conventional techniques and wiring. The analyzer cell is exposed to a designated energy environment which causes changes to the memory of the cell. These changes may be a manifestation of subtle energy resonance. Such changes can be detected and identified by comparison to the prior reading of the same memory. An energy signature is defined as a cumulative departure from an initial state. The memory of a cell may be initialized. An energy signature may be compiled and identified based on the analysis of changes to the memory of the cell.

In contrast, an exemplary generator may use a cell to generate a response, which may include an energy signature. The memory of a generator cell may be preset or imprinted with an energy signature. As such, the generator (and associated cell) may effect a change in the energy environment. This change may in turn be detected by an analyzer as a manifestation of subtle energy resonance. Copies of the same cell design may be used for both the analyzer and the generator.

Various embodiments of the present invention include methods for analysis of manifestations of subtle energy resonance. Such methods may include receiving a first reading of a memory, either in part or whole, of a cell including information concerning data elements in the memory array of the cell before the cell is exposed to an energy environment designated by a user. The first reading is stored in a memory coupled to an analysis device, which is communicatively coupled to the cell. Methods may further include receiving a second reading of the memory of the cell after the cell is exposed to the designated energy environment. Following sufficient exposure to the designated energy environment, there may be at least one change to a data element in the memory array of the cell. Methods may further include executing an analysis program to detect a discrepancy between the first reading of the memory array and the second reading of the memory array, determining an energy signature based on at least an analysis of the detected discrepancy, and generating a report concerning the determined energy signature. For example, such a report may indicate the number of changes per unit of time, as a correlate or indicator of exposure.

Other embodiments of the present invention include methods for generating a quantifiable response in a designated energy environment. The memory in the cell associated with the generator may be initialized using an energy signature preset or imprinted. Alternatively, an arbitrary value can be used. User and/or program control allows for examination of various possible combinations/values.

Still further embodiments of the present invention include systems for analysis and generative response of manifestations of subtle energy resonance. Such systems may include an interface communicatively coupled to an analyzer and a cell, the interface configured to receive information concerning data elements in a memory array of the cell, a memory configured to store a first reading of the memory array before the cell is exposed to an energy environment designated by a user, and a processor configured to execute an analysis program to detect a discrepancy between the first reading stored in memory and a second reading after the cell is exposed to an energy environment designated by a user, determine an energy signature based on an analysis of at least the detected discrepancy, and generate a report concerning the determined energy signature. The designated energy environment may include one or more generators. Settings that direct the operation of the analyzer and generator are under user control and/or program control.

Some embodiments of the present invention include computer-readable storage media having embodied thereon programs that, when executed by a processor or computing device, perform methods for analysis and generative response of manifestations of subtle energy resonance.

BRIEF DESCRIPTION OF THE FIGURES

FIG. 1B illustrates an exemplary cell for use in systems for analyzing and affecting manifestations of subtle energy resonance, within an energy environment, according to an embodiment of the present invention.

DETAILED DESCRIPTION

Embodiments of the present invention provide systems and methods for analyzing and affecting manifestations of subtle energy resonance. The system concerns the energy in a particular energy environment designated by the user (and/or it may include non-local quantum energies). Such analysis may be associated with a particular location of the cell, the structure and composition of any containing building, a person at the location, other proximate objects or animals, or any combination thereof. In exemplary embodiments, the contents of a memory array within a cell is read and stored in a memory of an analysis device. The cell is then exposed to a designated energy environment which causes changes to the memory array within the cell. Such changes may be detected and identified by comparison to a prior reading. An energy signature may then be generated based on an analysis of the identified changes to the memory array.

Figure 1A:
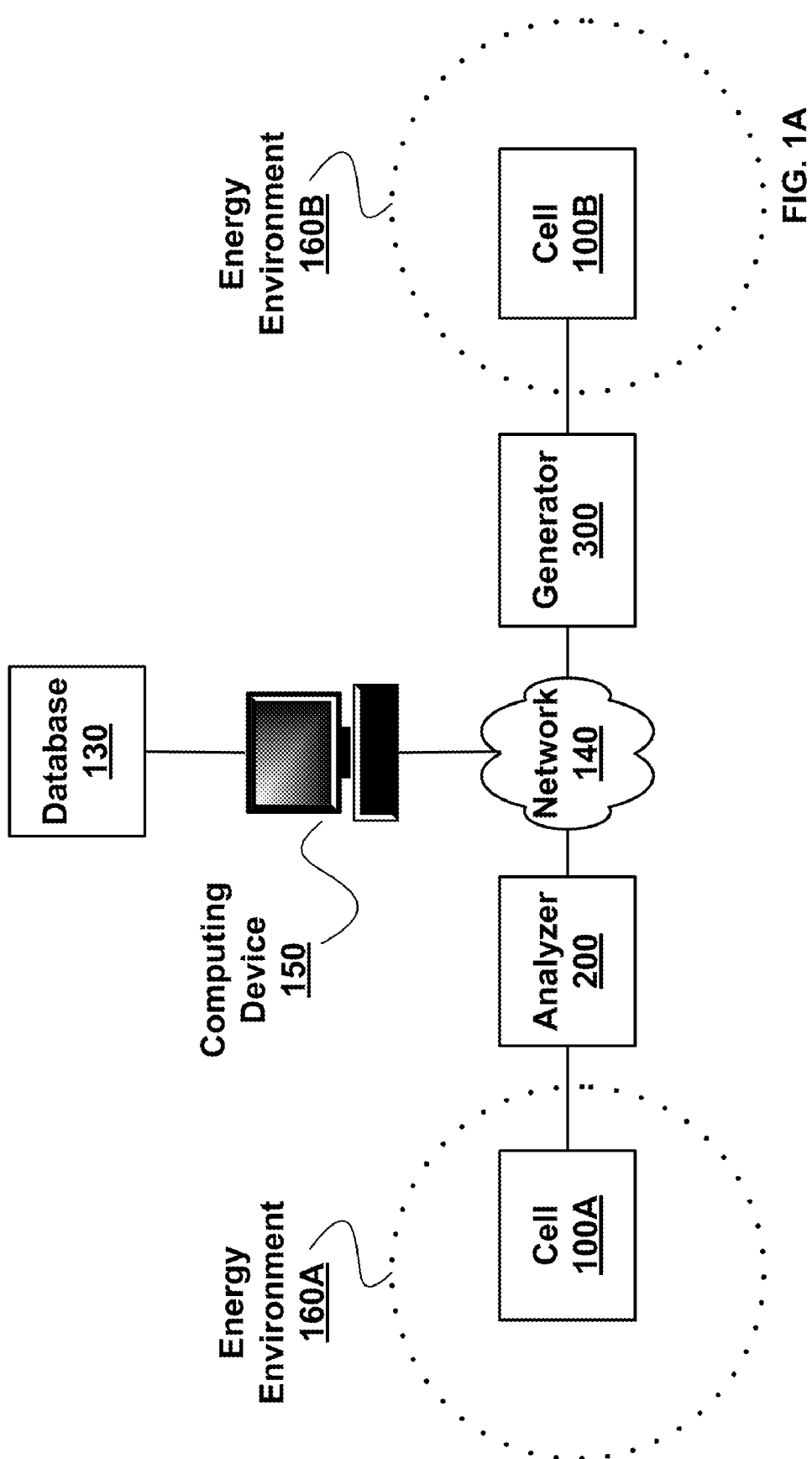
FIG. 1A illustrates an exemplary network architecture in which a system for analyzing and affecting manifestations of subtle energy resonance may be implemented, according to an embodiment of the present invention.

FIG. 1A illustrates an exemplary network architecture in which a system for analysis and generative response of manifestations of subtle energy resonance may be implemented, according to an embodiment of the present invention. The architecture as shown includes two cells; one in analytical mode, and one in generator mode. Other architectures may include multiple analyzers and generators. FIG. 1B illustrates the components within a cell, and is described in more detail below.

In FIG. 1A, one cell is coupled with an analyzer and one cell is coupled with a generator. One of the inherent symmetries within the system comes from using cells in multiple modes of operation. Resonant cell 100A is associated with an analyzer 200, an optional database 130 in communication with the analyzer 200 via a network 140 and a computing device 150. Cell 100B is associated and in communication with a generator 300.

Figure 2:
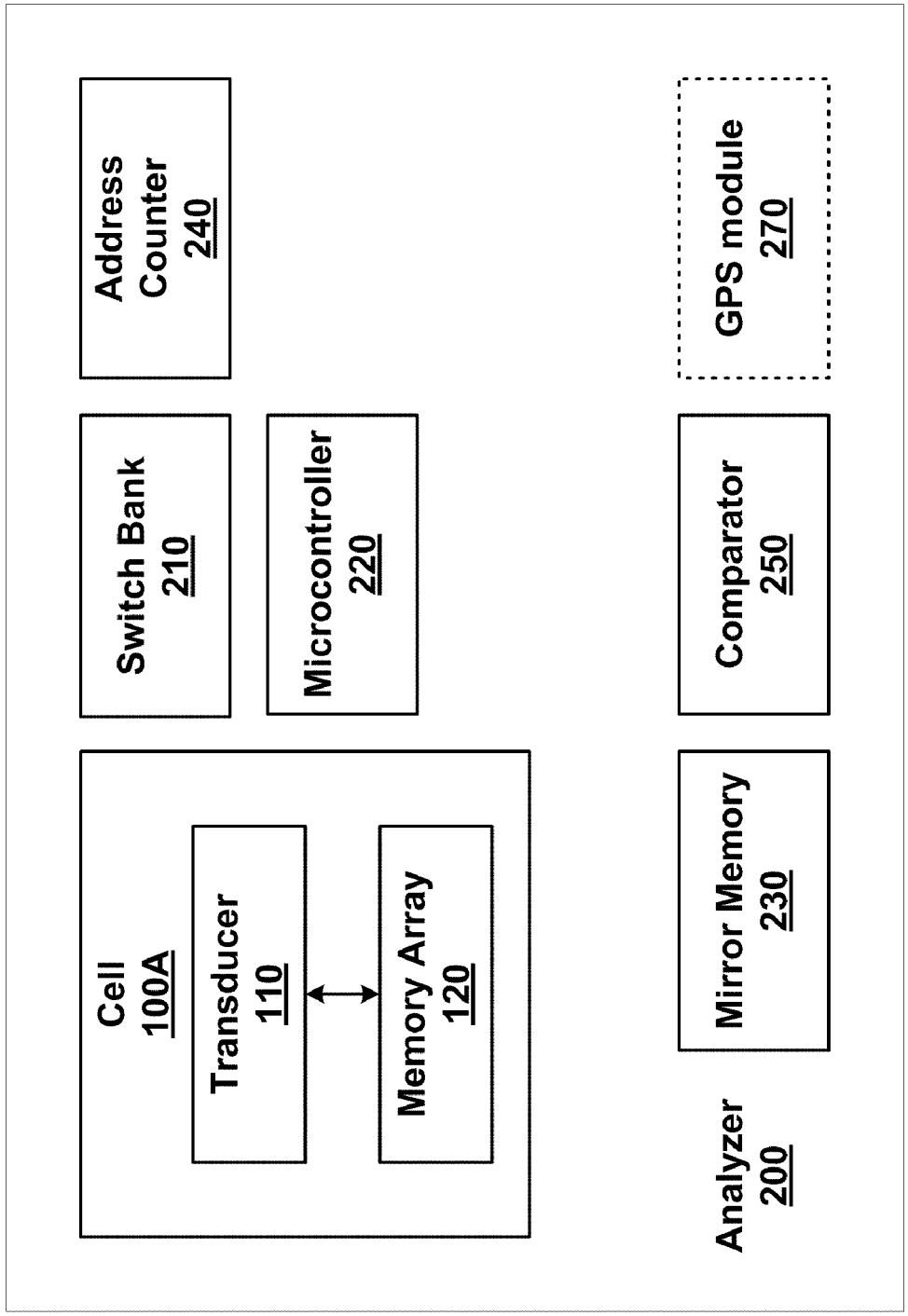
FIG. 2 illustrates an exemplary analyzer for analysis of manifestations of subtle energy resonance, according to an embodiment of the present invention.

FIG. 2 illustrates an exemplary embodiment of an analyzer. Cell 100A may be exposed to an energy environment 160A and detect manifestations of subtle energy resonance. Information concerning these manifestations is provided to analyzer 200 for analysis. The computing device 150 may provide instructions with respect to the type of analyses, and results of any analyses may be stored in database 130.

Figure 3:
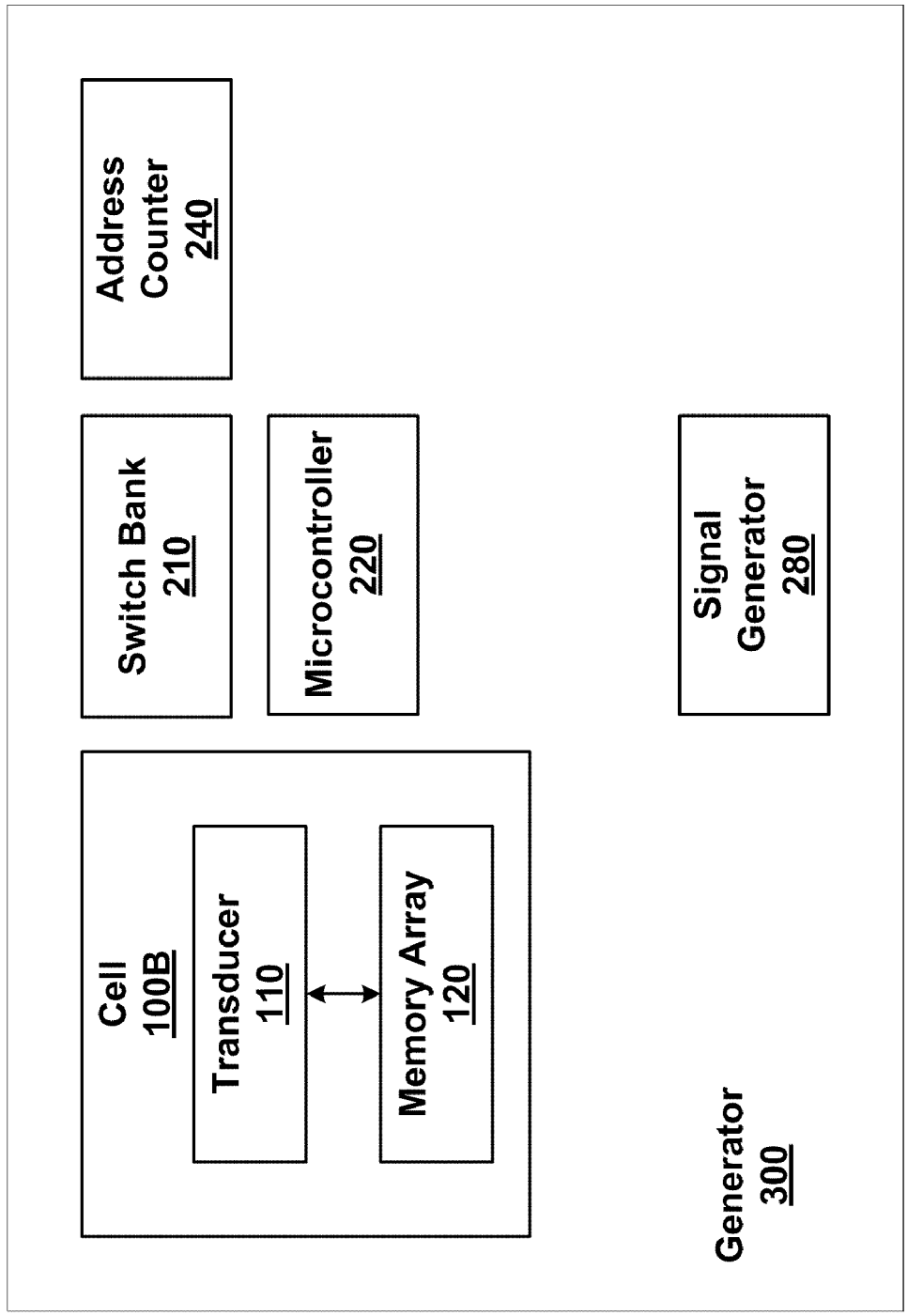
FIG. 3 illustrates an exemplary generator for generating quantifiable manifestations of subtle energy resonance, according to an embodiment of the present invention.
Figure 4:
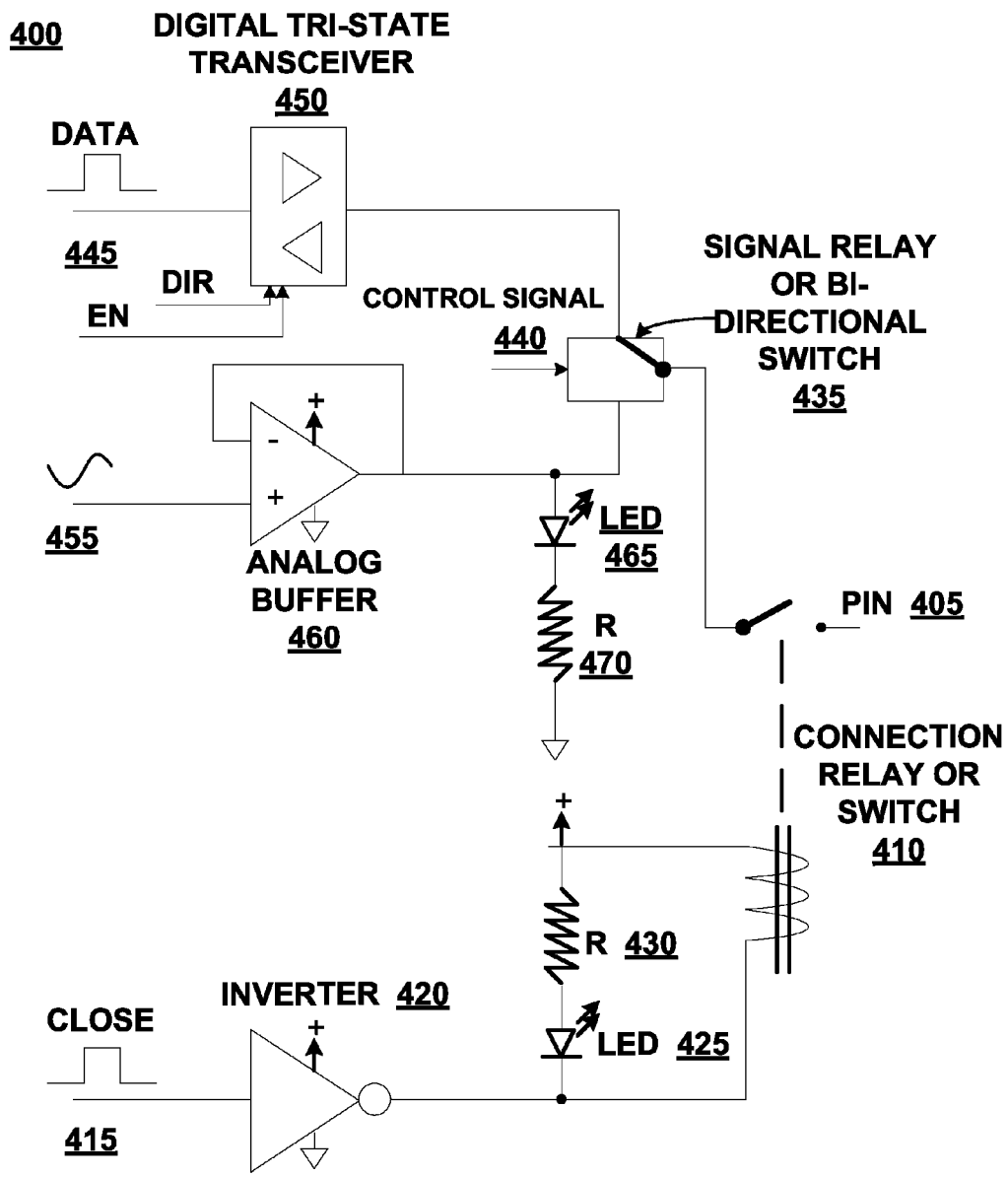
FIG. 4 illustrates exemplary circuitry to interface an analyzer or a generator with a cell, according to an embodiment of the present invention.

FIG. 3 illustrates an exemplary embodiment of a generator. Careful comparison of FIG. 2 with FIG. 3 will reveal additional symmetry of the system. FIG. 4 illustrates exemplary circuitry to interface either an analyzer or a generator with a cell. In other words, the circuitry of FIG. 4 allows a cell to change the mode of operation from analyzer to generator and back.

Analyzer 200 (described in further detail with respect to FIG. 2) is associated with a cell 100A to analyze information concerning the manifestations of subtle energy resonance provided by the cell 100A. In the embodiment illustrated in FIG. 1A, analyzer 200 is illustrated as being communicatively coupled to an external cell 100A. Alternatively, analyzer 200 may be housed together with cell 100A, as illustrated in FIG. 2. However associated with cell 100A, analyzer 200 is capable of receiving and analyzing data provided by cell 100A. Within analysis cell 100A, a transducer 110 may be a uniquely resonant material connected to memory array 120, or the transducer 110 function may be integrated into memory array 120 itself. The resonant material may include biological matter such as plants or living cells.

The analyzer 200 may further be communicatively coupled to a database 130 usually coupled to or residing within computing device 150. Database 130 may store one or more data readings, initialization information, rate of change, analyses, signatures, etc., in combination with information about the energy environment (for example, description of location, of individuals in the location, from states of bio-samples to states of mind, as entered by a user). The information stored in database 130 (for example, initialization information) may allow user recall of pre-existing settings for later use by a generator.

Some embodiments may include multiple analyzer cells 100, of either similar or contrasting designs. For example, given appropriate temperature compensation, excitation synchronization, clock precision and other controlling treatments, a multiplicity of analyzer cells 100A may serve to increase analysis accuracy. On the other hand, employing dissimilar cell designs may capture different manifestations, increasing the analysis range or resolution. In some instances, the database 130 may be associated with and store information provided by a plurality of analyzer systems, incorporating either similar or dissimilar cell designs.

In some embodiments, the analyzer 200 may communicate with database 130 via the network 140 and computing device 150. Network 140 may be any type of network known in the art for communication of data. Network 140 may include early and later local area networks (LANs), wide area networks (WANs), the Internet, USB, FireWire, PCs and various combinations thereof. Communication in network 140 may further incorporate a variety of communication networks including the Global System for Mobile communications (GSM), the General Packet Radio Service (GPRS), Enhanced Data rates for GSM Evolution (EDGE), Code Division Multiple Access (CDMA), or networks using the 3G mobile network standard. Network 140 may further include landline or satellite networks. In some instances, network 140 may further include various computing devices hosting and executing any variety of connection applications.

Further, computing device 150 may be any type of computing device known in the art for communicating over a network 140 and providing instructions and data to analyzer 200. For example, a user may use computing device 150 to input instructions regarding how often data readings should be taken and analyzed.

A designated energy environment 160 may include various types of energy sources, including energy capable of changing data elements in a memory array 120. As shown in the exemplary architecture in FIG. 1A, each of the cells 100A and 100B has a designated energy environment, labeled 160A and 160B respectively. Generally, a reading of the data elements of the memory array 120 may be taken before the cell 100A is exposed to energy environment 160A. Following exposure to energy environment 160A, some data elements may change from a prior reading. A subsequent reading may be taken of any bit or the entirety of memory array 120 at various intervals of time after cell 100A enters energy environment 160A.

Admittedly, subtle energy environment 160 may be inadvertently changed, for example, in the course of analysis by virtue of transducer 110 itself or deliberately changed, for example, by a generator. In some embodiments, the memory array 120 may be initialized based on user specifications. As a first example, a user may specify that a memory array 120 of (binary) data elements be initialized with a specific pattern, for example such that each data element indicates a value of zero. As a second example, a user may specify that a memory array 120 of data elements may be initialized with random values. As a third example, the binary elements may be initialized with a pattern or signature from a database. Any changes in the data elements and signatures may be captured and analyzed in real-time.

Generator 300 (described in further detail with respect to FIG. 3) is associated with a cell 100B. Generator 300 may be any type of computing device configured to control a generator cell 100B. In the embodiment illustrated in FIG. 1A, generator 300 is illustrated as being communicatively coupled to an external cell 100B. Alternatively, generator 300 may be housed together with cell 100B, as illustrated in FIG. 3. Generator 300 may have wiring corresponding to the analyzer 200, and/or the wiring of the generator 300 may not be traditional. Generator 300 may select a pin in generator cell 100B and change the value of the pin. As such, generator 300 may be used (in other words, by a user through a user interface) to change the resonance of cell 100B in a particular way. The process of changing the resonance by changing the signal connections may be referred to as tuning. A generator 300 may be associated with one or multiple generator cells 100B. By changing the resonance of cell 100B, a generator 300 may thereby cause a manifestation that is detectable by the analyzer cell 100A, which may be desired for various reasons, including research and effecting a change in an energy environment 160.

FIG. 1B illustrates an exemplary cell 100 for use in systems for analysis of manifestations of subtle energy resonance, within an energy environment 160 according to an embodiment of the present invention. An exemplary cell 100 includes a package of transducer material 110 (or transducer 110 for short) and a memory array 120.

Figure 1C:
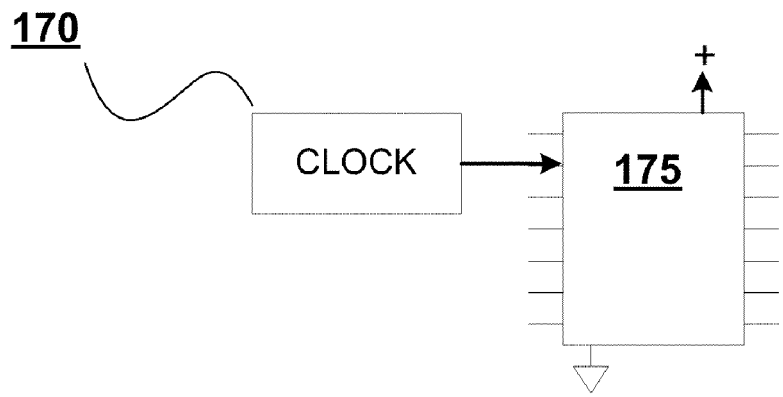
FIG. 1C illustrates an exemplary configuration for a possible excitation of a memory array.
Figure 1D:
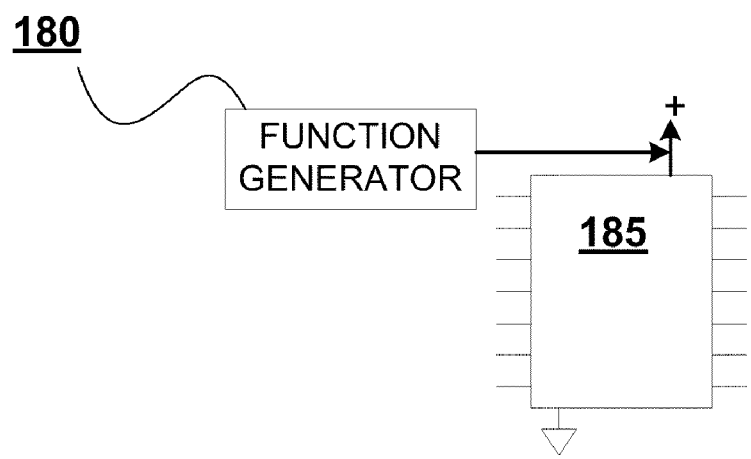
FIG. 1D illustrates an exemplary configuration for another possible excitation of a memory array.
Figure 1E:
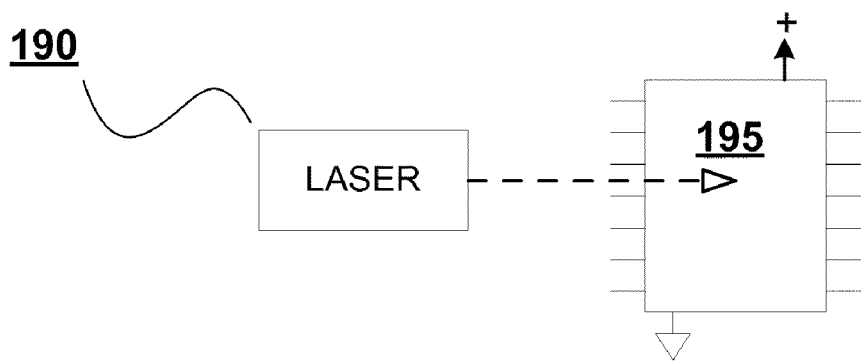
FIG. 1E illustrates another exemplary configuration for an excitation of a memory array.

Within cell 100, transducer 110 may be any crystalline material bondable with a memory array 120 that is responsive to energy from a designated energy environment. As such transducer 110 may incorporate various chemical, biological, organic or inorganic, animate or inanimate materials, including but not limited to living organisms. For example, a transducer 110 may include one or more plants or amoebae. Each material included in a transducer 110 may exhibit a characteristic resonance. As such, by combining different materials, transducer 110 may exhibit a resonance resulting from a combination of the resonances of the different materials. When transducer 110 is exposed to a given energy environment for a sufficient duration, data elements of memory array 120 may change. Such a manifestation may be detected and analyzed. In one embodiment the excitation of cell 100A is accomplished electronically. The means of excitation may vary according to the material chosen for transducer 110, exemplified by means as diverse as simple mechanical triggers or lasers. FIGS. 1C, 1D, and 1E illustrate exemplary excitations of a memory array.

Memory array 120 includes multiple data elements, each of which may be affected by the resonant energy from transducer 110. In some cases, the arrangement of the data elements of memory array 120 may resemble a crystalline lattice structure. As such, memory array 120 is susceptible to energy resonance. The susceptibility of memory array 120 to subtle energy resonance may be based on being operated in an electronic boundary state which encourages crystal emulation as opposed to normal electronic functioning. Specifically, upon exposing the cell 100 to a particular energy environment 160, as shown in FIG. 1A, data elements of memory array 120 may be changed. For example, a particular binary data element may initially indicate 0. Upon exposure to an energy environment 160, the data element may be changed to indicate 1. Depending on the specific transducer 110 characteristics there may be dozens, hundreds, thousands, etc. of data elements in memory array 120 changed after exposure to an energy environment 160. Such changes may take a period of time to occur and/or detect. The changes may further be based on the particular energy/resonance of the energy environment 160 that effect a change in the resonance of transducer 110. Further, the overall resonance of cell 100 (in other words, analyzer cell 100A of FIG. 1A) may be basically established by transducer 110, and then dynamically changed with any change in the data elements of associated memory array 120.

FIG. 1C illustrates an exemplary excitation 170 of a memory array 175 by means of connecting a digital clock signal to at least one pin of the memory array. Other pins may or may not be connected.

FIG. 1D illustrates an exemplary excitation 180 of a memory array 185 by means of connecting a function generator (labeled FUNCTION GENERATOR) to the power supply of the memory array. Other pins may or may not be connected.

FIG. 1E illustrates an exemplary excitation 190 of a memory array 195 by means of aiming a laser at the memory array. The pins of memory array 195 may or may not be connected.

FIG. 2 illustrates an exemplary analyzer system 200 for analyzing manifestations of subtle energy data resonance. Such an analyzer 200 may include the aforementioned cell 100A containing a transducer 110 and a memory array 120, and further include a switch bank 210, a microcontroller 220, a mirror memory 230, an address counter 240, a comparator 250, and an optional GPS module 270.

The analyzer 200 may include a switch bank 210 of one or more switches for isolating cell 100A from the rest of the system. Such isolation reduces and/or eliminates any disturbances to the transducer 110 (and to the memory array 120) from the other elements of the analyzer 200. Although reference is made to switches, switch bank 210 may include any combination of connective components such as switches, relays, optics, capacitors, and other semiconductor elements, that do not interfere with the inherent resonance of the cell.

Microcontroller 220 may be any microcontroller (for example, BASIC STAMP) which has enough control power to orchestrate the functions of the analyzer hardware. An exemplary microcontroller 220 may offer a minimum of 16 pins (either I/O, inputs or outputs), a serial or USB interface, and user memory. A program (for example, BS2 STAMP program) stored in the user memory may be executed by microcontroller 220 to operate the switch bank 210, analyzer memory addressing, comparison detection, data change logging, memory updating, accumulation, user indications (counters, lights, sounds) and reporting. Microcontroller 220 may further execute instructions for initializing the memory array 120, starting and stopping the analysis, and adjusting the sampling period (for example, 1 sec.-24 hrs). In exemplary embodiments, the analyzer sampling routine allows for either a fast and complete check of all addresses of data elements in a memory array 120, or a bit-by-bit analysis at any rate.

Mirror memory 230 is used to store a previous state of memory array 120 of cell 100A against which a current state of the sensor is compared. Mirror memory 230 therefore has at least the same memory capacity, if not structure, as the memory array 120. For example, before the cell 100A is exposed to energy environment 160A, a reading is taken. Such a reading may be taken following initialization of memory array 120. That reading may then be stored (in other words, mirrored) in mirror memory 230. When the cell 100A is exposed to an energy environment, some data elements in memory array 120 may change. To determine which data elements are changed, the contents of memory array 120 is compared to that of mirror memory 230. In some instances, mirror memory 230 may be updatable to reflect a more recent state of memory array 120. For example, mirror memory 230 may be updated to reflect the state of memory array 120 after an hour of exposure to energy environment 160A. Any part of mirror memory 230 may then be compared to memory array 120 after another hour, five hours, a day, a week, etc., of exposure to energy environment 160A. The changes can be counted and the rate of change can subsequently be determined and used or stored for future reference.

Address counter 240 may be any combination of hardware and software configured to set an address for each data element in a memory array (for example, memory array 120 or mirror memory 230). To reduce address comparison errors address counter 240 may simultaneously set the address for a data element of memory array 120 and a corresponding data element of mirror memory 230.

Comparator 250 inspects the memory array 120 of cell 100A to see when and where changes occur. The comparator 250 is configured to identify any changed data elements in memory array 120 based on comparison to the corresponding data elements in mirror memory 230 and determine the address location and value for each changed data element. For example, the function of comparator 250 may be executed by microcontroller 220 at a certain time after exposure to energy environment 160A. Comparator 250 determines whether there is a difference between two elements presented to it (for example, a data element in memory array 120 and the corresponding data element in mirror memory 230). In some hardware or software embodiments, the comparison may occur at the byte level rather than the bit level. In some embodiments, detection of a difference will initiate a response, which may include incrementing a counter, lighting an LED light, a sound, and generation of an indication that at a certain address a data difference occurred since the last time that address was checked. Once the difference indication has been accumulated in a report (for example, a printed report, by way of database 130), the mirror memory 230 may be updated to reflect the most recent reading of memory array 120.

An optional GPS module 270 may be included in the analyzer 200 to provide accurate location and/or time information. Such information may be included in the information provided to database 130 such that accurate record-keeping may be maintained. As such, a reading of memory array 120 taking place in a particular energy environment 160A would be accompanied with information regarding the particular geographic location where the reading was taken, as well as the time that the reading was taken.

FIG. 3 illustrates an exemplary generator system 300 for generating quantifiable manifestations of subtle energy data resonance. Such a generator 300 may include the aforementioned cell 100B containing a transducer 110 and a memory array 120. Generator 300 additionally includes many of the same components as analyzer 200 which perform the same functions in the same way. This symmetry in the system is intentional. Generator 300 includes a switch bank 210, a microcontroller 220, an address counter 240, and a signal generator 280. An energy signature can be preset or imprinted into memory array 120, possibly copying a value received from cell 100A. Alternatively, an arbitrary value can be used. While signatures acquired from the analyzer may be loaded/initiated in the generator, they will likely change interactively. User and/or program control allows for methodically exhausting all possible combinations/values in search for better resonance and improved rate of change for a given application.

FIG. 4 illustrates exemplary circuitry to interface an analyzer or a generator with a cell, according to an embodiment of the present invention. Circuitry 400 allows a cell to change the mode of operation from analyzer to generator and back, either under user or program control. For this facility, several input-output signal options are required. First, it should be possible to isolate the cell so its resonance is not altered by associated circuitry. Second, for analysis it needs to be possible to configure the device normally, for example, so that memory array 120 can be read by conventional techniques. Third, for generation it should be possible to drive each pin unconventionally.

Any pin 405 of memory array 120 is first isolated by connection relay or switch 410. While mechanical isolation as shown is parsimonious, the connection relay or switch 410 may be solid-state or opto-electronic as long as bi-directionality is maintained. In the example wiring, a high CLOSE control signal 415 through inverter 420 produces a low signal which simultaneously closes connection relay or switch 410 and enables LED indicator 425 through current-limiting resistor 430. This satisfies the first requirement. Signal relay or bi-directional switch 435 allows setting the mode of operation to digital (for analysis) or analog (for generation), according to its control signal 440. In the first case signal relay or bi-directional switch 435 selects normal digital input/output data 445 which is typically transceived through a digital tri-state transceiver 450. Digital tri-state transceiver 450 typically has control pins for data direction (DIR) and transfer enable (EN). This satisfies the second requirement. Optionally, signal relay or bi-directional switch 435 selects any analog voltage or function 455 buffered through analog buffer 460. In this case the analog output is not inverted, which is indicated by LED 465 through current-limiting resistor 470. This satisfies the third requirement.

Figure 5:
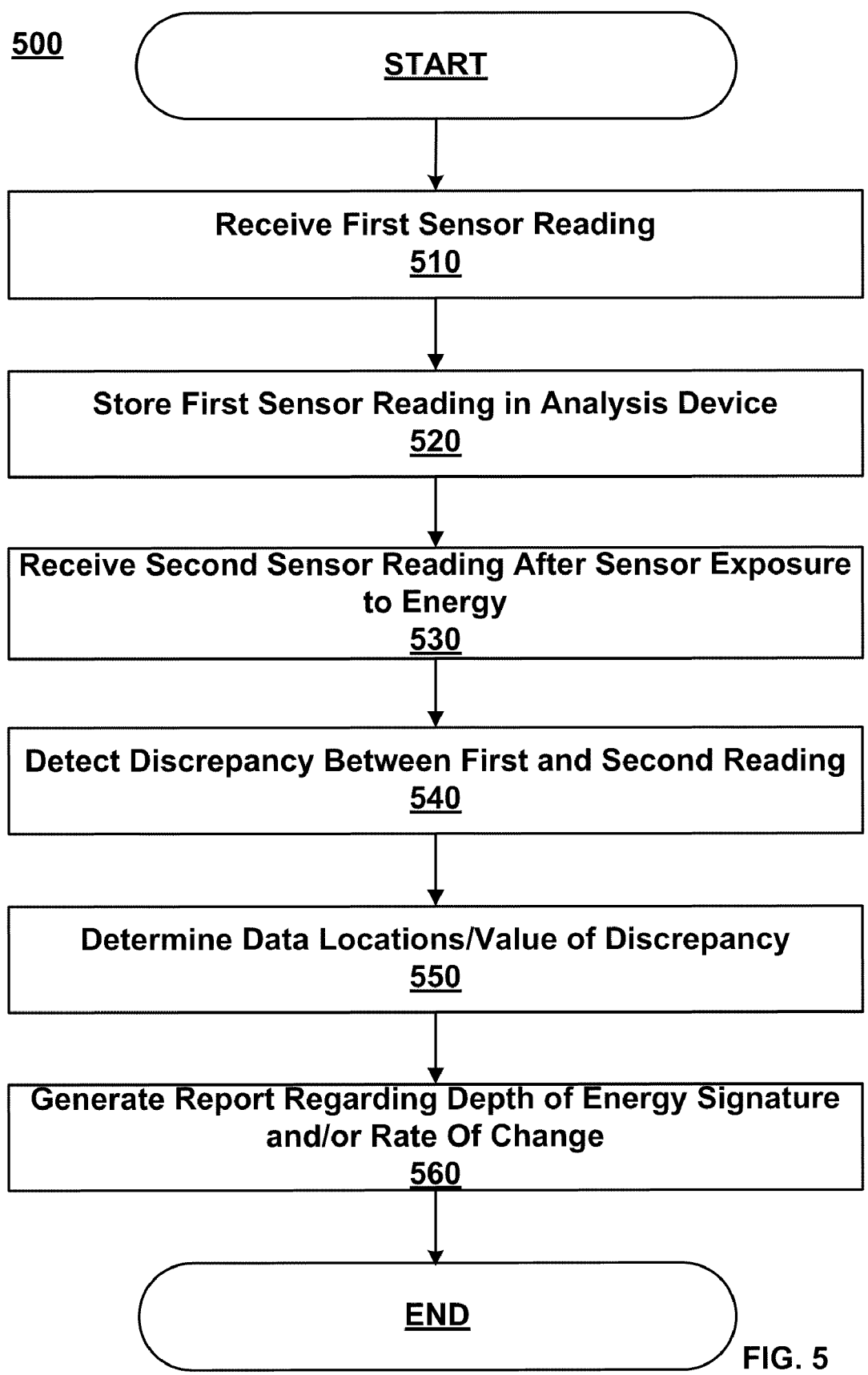
FIG. 5 is a flowchart illustrating an exemplary method for analysis of manifestations of subtle energy resonance, according to an embodiment of the present invention.

FIG. 5 is a flowchart illustrating an exemplary method for analysis of energy data. In the method, a cell 100A reading is received and mirrored in the analyzer device. A next cell reading is taken after exposure to an energy environment 160A. Changes are detected by comparison to the first reading. A signature is generated based on the detected changes, and a report is generated regarding the signature.

In step 510, a sensor reading is received. A reading of memory array 120 is taken and provided to the analyzer 200. In some instances, the reading may be taken after the memory array 120 is initialized with specific or arbitrary data. Alternatively, the present status of memory array 120 may be read as is without initialization.

In step 520, the sensor reading taken in step 510 is stored. Such a reading may be mirrored in mirror memory 230 of analyzer 200. In some instances, the reading may also be provided to database 130. Because gathering data concerning energies in energy environment 160A is based on detecting changes to data elements in memory array 120, an initial state of memory array 120 may be used for comparison against a later state.

In step 530, a subsequent sensor reading is received. Generally, this may occur after the cell 100A is exposed or further exposed to an energy environment 160A. If the energy environment 160A causes any changes, such changes may be detected by taking the reading subsequent to exposure to the energy environment 160A. In some cases, multiple readings may be taken at various points of exposure (for example, after an hour of exposure, after several hours, after a day, after a week, etc.).

In step 540, a discrepancy is detected between the reading taken in step 510 and stored in mirror memory 230 and the subsequent reading taken in step 530. Detection of the discrepancy may occur when comparator 250 compares memory array 120 with mirror memory 230. In some embodiments, comparator 250 may further be executed in combination with address counter 240 to determine the address(es) of the data elements that have changed as detected based on the comparison. If desired, standard logic operations can then be used to further determine the specific bits involved.

In step 550, change rate is determined based on the detected discrepancy. Such a rate of change may be generated based on information concerning the addresses of the data elements that were identified as being changed in step 540. When multiple subsequent readings are taken, successive changes may be identified or detected by comparing such subsequent readings with a previous reading. For a given exposure period, the total difference between the initial and current data is a signature. Signatures may be identified as specific patterns of change.

In step 560, a report is generated concerning the signature and/or change rate determined in step 550 and/or any other information related to any changes as determined in step 540. Such a report may include a printed report, an electronic report, error rate/locations, which may be sent to various parties, including database 130. Database 130 may store multiple change reports based on multiple signatures, sent from multiple analyzer systems, etc.

The terms "computer-readable storage medium" and "computer-readable storage media" as used herein refer to a medium or media that participates in providing instructions to a CPU for execution. Such media can take many forms including, but not limited to, non-volatile and volatile media. Non-volatile media include, for example, optical or magnetic disks, such as a fixed disk. Volatile media include dynamic memory, such as system RAM. Common forms of computer-readable storage media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASH EPROM, any other memory chip or cartridge.

Transmission media may include coaxial cables, copper wire and fiber optics and various computer busses. Transmission media can also take the form of acoustic or light waves such as those generated during radio frequency (RF) and infrared (IR) data communications. Carrier wave or other media for transmission of information may be used. Various forms of transmission media may be involved in carrying one or more sequences of one or more instructions to a CPU for execution.

While the present invention has been described in connection with a series of preferred embodiments, these descriptions have been presented by way of example only and are not intended to limit the scope of the invention to the particular forms set forth herein. Thus, the breadth and scope of a preferred embodiment should not be limited by any of the above-described exemplary embodiments. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A circuit for analyzing and generating subtle energy resonance, the circuit comprising:
    an isolator switch that opens and closes a physical connection to a pin, wherein a signal is allowed to reach the pin of a memory array when the isolator switch is closed and wherein the pin is isolated when the isolator switch is opened;
    a bidirectional digital-analog switch coupled in series with the isolator switch;
    a buffer coupled with an analog port of the bidirectional digital-analog switch, wherein a signal is allowed to reach the isolator switch through the buffer and the bidirectional digital-analog switch; and
    a digital tri-state transceiver coupled with a digital port of the bidirectional digital-analog switch, wherein digital access to the isolator switch is provided through the digital tri-state receiver and the bidirectional digital-analog switch.

2. The circuit of claim 1, wherein the pin is coupled with a memory array.

3. The circuit of claim 2, wherein the signal allowed to reach the isolator switch through the buffer and the bidirectional digital-analog switch provides an excitation of the pin to tune the memory array.

4. The circuit of claim 2, wherein the digital access to the isolator switch through the digital tri-state receiver and the bidirectional digital analog-switch provides read and write access to the memory array.

5. The circuit of claim 3, wherein the excitation is generated at least in part by a digital clock signal.

6. The circuit of claim 3, wherein the excitation is generated at least in part by a function generator.

7. The circuit of claim 3, wherein the excitation is generated at least in part by a laser.

8. The circuit of claim 1, wherein the resonance is generated at least in part by a crystalline element.

9. The circuit of claim 8, wherein the crystalline element is at least one of a natural crystalline element, a synthetic crystalline element, a chemical crystalline element, and a biological crystalline element.

* * * * *